US008737765B2

(12) United States Patent
Reibman

(10) Patent No.: US 8,737,765 B2
(45) Date of Patent: *May 27, 2014

(54) NO-REFERENCE SPATIAL ALIASING MEASURE FOR DIGITAL IMAGE RESIZING

(71) Applicant: AT&T Intellectual Property I, L.P., Atlanta, GA (US)

(72) Inventor: Amy Ruth Reibman, Chatham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/770,486

(22) Filed: Feb. 19, 2013

(65) Prior Publication Data
US 2013/0156342 A1  Jun. 20, 2013

Related U.S. Application Data

(63) Continuation of application No. 12/576,416, filed on Oct. 9, 2009, now Pat. No. 8,401,330.

(51) Int. Cl.
G06K 9/40 (2006.01)
G06T 5/00 (2006.01)

(52) U.S. Cl.
CPC ....... *G06T 5/002* (2013.01); *G06T 2207/20052* (2013.01)
USPC ....................................... 382/275

(58) Field of Classification Search
USPC .................. 382/275, 298, 299; 345/698, 670; 348/222.1; 375/240.24, 240.27
See application file for complete search history.

(56) References Cited

U.S. PATENT DOCUMENTS

| 7,095,786 B1* | 8/2006 | Schonfeld et al. ....... 375/240.16 |
| 7,773,831 B2 | 8/2010 | Cresens |
| 7,957,467 B2 | 6/2011 | Ha et al. |
| 2010/0060749 A1 | 3/2010 | Srinivasan et al. |
| 2011/0085744 A1 | 4/2011 | Reibman |

OTHER PUBLICATIONS

"Non-Final Office Action for U.S. Appl. No. 12/576,416", United States Patent and Trademark Office (USPTO), mail date Aug. 15, 2012; 14 pages.
"Notice of Allowance and Fee(s) Due for U.S. Appl. No. 12/576,416", United States Patent and Trademark Office (USPTO), mail date Nov. 21, 2012; 10 pages.
Reisman, Amy R et al., "A No-Reference Spatial Aliasing Measure for Digital Image Resizing", Image Processing, 2008, ICIP 2008, 15th IEEE, Current Version Published Dec. 12, 2008, 5 pages.

* cited by examiner

*Primary Examiner* — Yon Couso
(74) *Attorney, Agent, or Firm* — Tolar Law Group, PC

(57) ABSTRACT

A method includes identifying an area in an image that is associated with strong directional energy. The method further includes determining a first estimate of signal energy for the area and a second estimate of aliasing energy for the area. The method further includes estimating a severity of an aliasing error of the image based on the first estimate and the second estimate.

20 Claims, 9 Drawing Sheets

402

404　　　　　　　　　　406　　　　　　　　　　408

NO-REFERENCE SPATIAL ALIASING MEASURE FOR DIGITAL IMAGE RESIZING

CLAIM OF PRIORITY

The present application is a continuation of and claims priority from U.S. patent application Ser. No. 12/576,416, filed on Oct. 9, 2009 and entitled "NO-REFERENCE SPATIAL ALIASING MEASURE FOR DIGITAL IMAGE RESIZING," the contents of which are expressly incorporated herein by reference in their entirety.

FIELD OF THE DISCLOSURE

The present disclosure is generally related to measuring spatial aliasing.

BACKGROUND

Aliasing introduced during image resizing or wavelet coding degrades image quality by causing pixellation, jagginess, geometric deformation, and inhomogeneity in contrast. The issue of spatial aliasing in image resizing has been explored, both in terms of the design of polyphase filters to reduce aliasing and with the introduction of a family of filters that provides a way to choose filters that balance a trade-off between blurring and aliasing during image resizing. These filters do not directly consider the visual impact of aliasing or how objectionable the aliasing artifacts are. Perceptual models consider low- and mid-level aspects of the human visual system to quantify the impact of image degradation. The perceptual models are usually full-reference (FR) metrics that rely on the availability of an original image for comparison. However, in many applications, an original image is not available.

DETAILED DESCRIPTION

Figure 1:
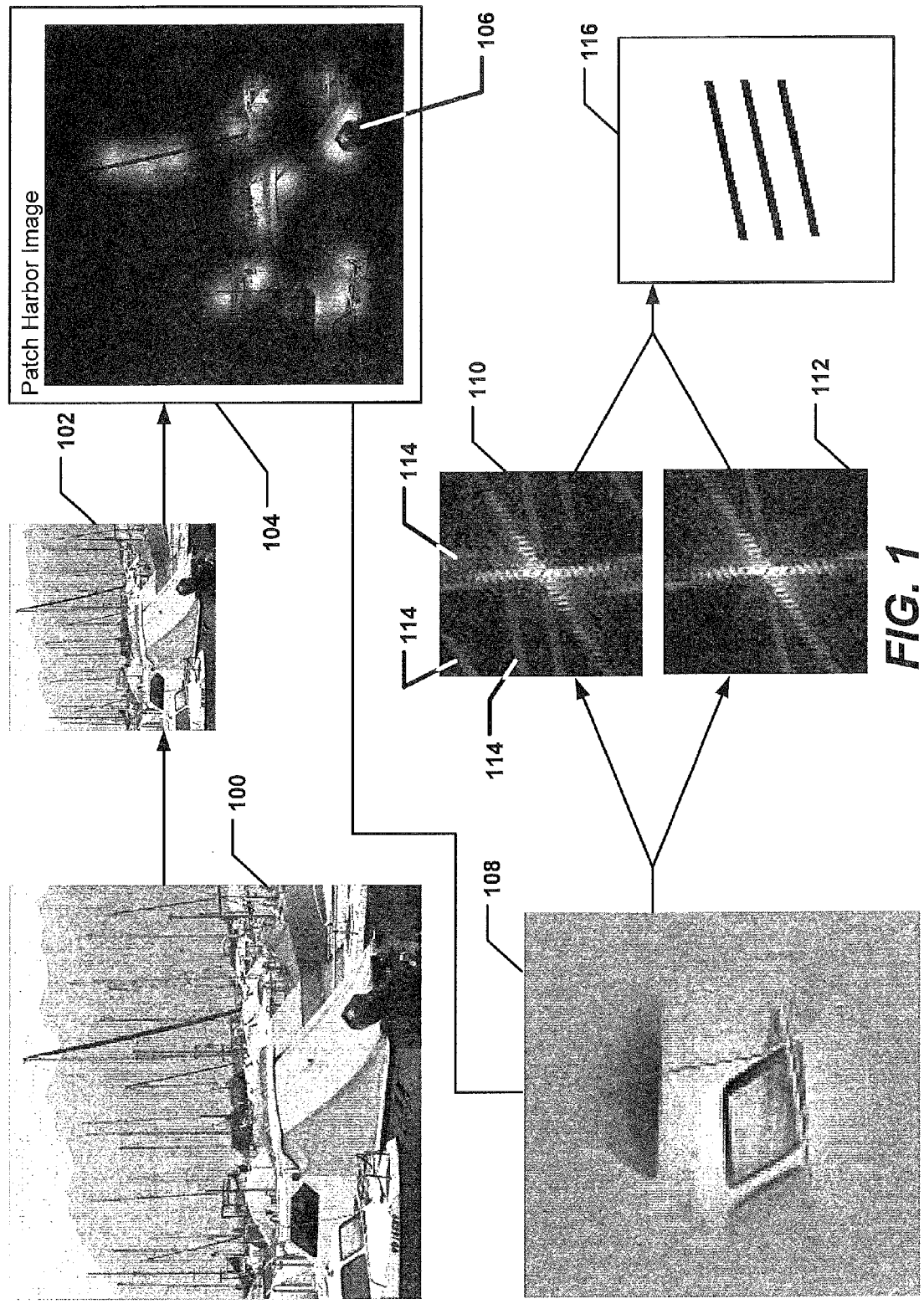
FIG. 1 is a block diagram of one embodiment of a system to estimate the severity of an aliasing error on an image.

In a particular embodiment, a method for detecting aliasing artifacts includes receiving a second image that has been converted from a first image and evaluating the second image using a computer to detect aliasing artifacts due to the conversion. The second image is a different size than the first image. The evaluation is performed without reference to the first image. In a particular embodiment, the second image is evaluated by identifying patches in the image that are likely to contain strong directional energy with few distractions and to estimate a direction component for each of the identified patches. For each of the identified patches, the total energy of the patch is partitioned into an estimated signal energy and an estimated aliasing energy. The estimated aliasing energy and the estimated signal energy of each of the identified patches are combined to obtain an estimate of the aliasing artifacts in the image. In a particular embodiment, the estimated aliasing artifacts are calculated by using an estimated energy in a signal without aliasing divided by an estimated energy in aliasing components of the image.

In another particular embodiment, the identified patches are processed using a Blackman-Harris window. In another particular embodiment, the mean image value or brightness of the entire image is subtracted from the patch to eliminate image boundary effects.

In another particular embodiment, a device to estimate the severity of an aliasing error includes a directional image module to identify patches likely to contain strong directional energy with few distractions and to estimate a finely quantized direction for each energy patch, a partitioning module that, for each energy patch, partitions energy into estimated signal energy and aliasing energy based on the aliasing locations predicted by detected directional components, and an estimate module to combine the estimated aliasing and signal energies across the patches to obtain an estimate of the severity of the aliasing error. In a particular embodiment, patches likely to contain strong directional energy with few distractions are identified by the areas with maximum contrast variance.

In another particular embodiment, a device to measure the impact of aliasing includes a directional energy module to measure jagginess caused by aliasing. In a particular embodiment, the jagginess is measured by identifying image regions with strong directional energy to obtain a direction of the strong directional energy to determine a frequency location of potential aliasing. An estimate module estimates an aliasing at the frequency location and forms an estimate of the signal without aliasing. A signal-to-aliasing ratio module forms a signal-to-aliasing ratio over all image regions to obtain an overall image measure of the impact of aliasing.

In another embodiment a no-reference measure measures the impact of aliasing for image resizing. The measure focuses on the aliasing energy associated with visible jagginess in areas with strong directional energy. In a particular embodiment, only the aliasing contributions that are not masked by the corresponding signal energy are considered.

Generally, during image resizing an input image x[n] is up sampled by a factor L, filtered by an aliasing-reduction filter h[n], and then down sampled by a factor M to create an output image y[n]. The output image will typically have aliasing that affects both the picture quality and the image spectrum. The impact of the aliasing can be analyzed by combining the estimated signal energy and the estimated aliasing artifacts of the image.

In one embodiment, a discrete-time Fourier transform (DTFT) of the output image can be expressed as $$Y(\omega) = \frac{1}{M} \sum_{k=0}^{M-1} Y_I\left(\frac{\omega}{M} + \frac{2\pi k}{M}\right)$$

-continued $$= \frac{1}{M} Y_I\left(\frac{\omega}{M}\right) + \frac{1}{M} \sum_{k=1}^{M-1} Y_I\left(\frac{\omega}{M} + \frac{2\pi k}{M}\right)$$

where $Y_I(w)=H(w)X_I(w)$, $H(w)$ is the DTFT of $h[n]$, and $X_I(w)=X(Lw)$ is the DTFT of the intermediate signal prior to filtering. The above summation is the aliasing due to down sampling. While equations using one dimension are shown throughout for notational simplicity, the extension to two dimensions can be readily understood by those in the art.

If not completely eliminated by the filter $H(w)$, the folding process, during the down sampling, adds high-frequency content from $x[n]$ into the low frequencies of $y[n]$. However, the first term may also contain aliasing if up sampling occurs, such as if L>M. The content of $X(w)$ from $\pi/L \le |w| < \pi$ will produce aliasing unless attenuated by the filter $H(w)$. Therefore, $Y_0(w)$ is defined to be the DTFT of the resized signal that would be obtained if the filter perfectly removes all content with $|w| > \pi/\max(M,L)$. The actual aliasing in $Y(w)$, using a non-ideal filter $H(w)$, is $$A(\omega) = Y(\omega) - Y_0(\omega)$$

$$= H\left(\frac{\omega}{M}\right)X_0\left(\frac{L\omega}{M}\right) + \frac{1}{M} \sum_{k=1}^{M-1} H\left(\frac{\omega}{M} + \frac{2\pi k}{M}\right)X\left(\frac{L\omega}{M} + \frac{2\pi kL}{M}\right)$$

where $X_0(Lw/M)=0$ for $|w|<\pi/\max(M,L)$ and $X(Lw/M)$ otherwise.

Referring to FIG. 1, the impact of aliasing on an image is illustrated. FIG. 1 shows a full harbor image 100. The full harbor image 100 is down sampled to produce a down sampled harbor image 102. In a particular embodiment, the full harbor image 100 is down sampled by a factor of four (M=4).

The impact of aliasing can be analyzed by decomposing the down sampled harbor image 102 into overlapping patches 106 to produce a patch harbor image 104. In a particular embodiment, each patch 106 in the patch harbor image 104 is windowed to eliminate image-boundary effects. In signal processing, a window function is a function that is zero-valued outside of a chosen interval. For example, a function that is constant inside the chosen interval and zero elsewhere is called a rectangular window because a rectangle may generally describe the shape of the window's graphical representation. When another function or a signal is multiplied by a window function, the resulting product is also zero-valued outside the interval. The zero-value outside the interval may be used to eliminate or reduce image-boundary effects.

In one embodiment, the window is a Blackman-Harris window. A one-dimensional Blackman-Harris window is a summation of 3 or 4 cosine functions in one dimension. A two dimensional Blackman-Harris window is a product of two one-dimensional Blackman-Harris windows in each of the two dimensions. The Blackman-Harris windows are a family of three and four term windows where variations on the coefficients allow a trade between main-lobe width and side-lobe level. Different windows may be used and the Blackman-Harris window is chosen for illustration purposes only. For example, the Blackman-Harris window has similar performance as a Kaiser-Bessel window, except that the Blackman Harris window can suppress the side lobes more than ninety-two decibels (92 dB) at a cost of an eleven percent (11%) wider noise bandwidth.

A windowed patch 108 shows one windowed patch from the lower-left corner of the patch harbor image 104. Aliasing is visible in the near-vertical and near-horizontal lines within the windowed patch 108. A spectrum 110 of the windowed patch 108 is created using the log of the squared-magnitude of the DFT with the DC value removed. An ideal spectrum 112 shows a similar spectrum for the same image region with ideal down sampling. As shown in the spectrum 110 and the ideal spectrum 112, there are four areas of strong directional energy, emanating from the DC location in the center. The direction of the energies is relatively perpendicular to the direction of the strong edges in the windowed patch 108. However, in the spectrum 110 there are also three strong aliasing components 114 that were introduced during down sampling by the spectral folding process described in equation (1) above. The three strong aliasing components 114 do not go through the origin, but instead are folded-over continuations of a directional energy.

Directional energy and aliasing mask 116 illustrate the location of folded directional energy for the first term in the summation of equation (1) above. Folded directional energy occurs when the Nyquist frequency, also called the folding frequency, is equal to half the sampling frequency and is the demarcation between frequencies that are correctly sampled and those that cause aliases. The term 'folded' is used because aliases will be 'folded' from the Nyquist frequency back into the useful frequency range. For example, a tone 1 kHz above the Nyquist frequency will fold back to 1 kHz below. In addition, frequencies above the sampling frequency may also folded back and produce folded directional energy. Sometimes, the folded directional energy has little impact on a frequency region because the frequency region has high energy and the addition of the folded directional energy is not visible in the down sampled spectrum. However, for windowed patch 108, the folded energies are visible in the down sampled spectrum because they are added into frequency regions that have little energy in the original image patch.

It is often inherently difficult to assess image degradation in a no reference environment, or an environment where the down sampled image cannot be compared to the original image, because it is relatively difficult to distinguish between artifacts in the down sampled image and the actual desired image content in the down sampled image. However, in image patches where most of the energy is primarily directional, but not at zero, forty-five, or ninety degrees, it is likely that the folded aliasing energy will have little overlap with the signal content. Therefore, as shown in the spectrum 110, it can be possible to partition the overall energy into aliasing and signal components where the aliasing components are identified as the aliasing components 114 and the signal components are shown in the ideal spectrum 112.

Figure 2:
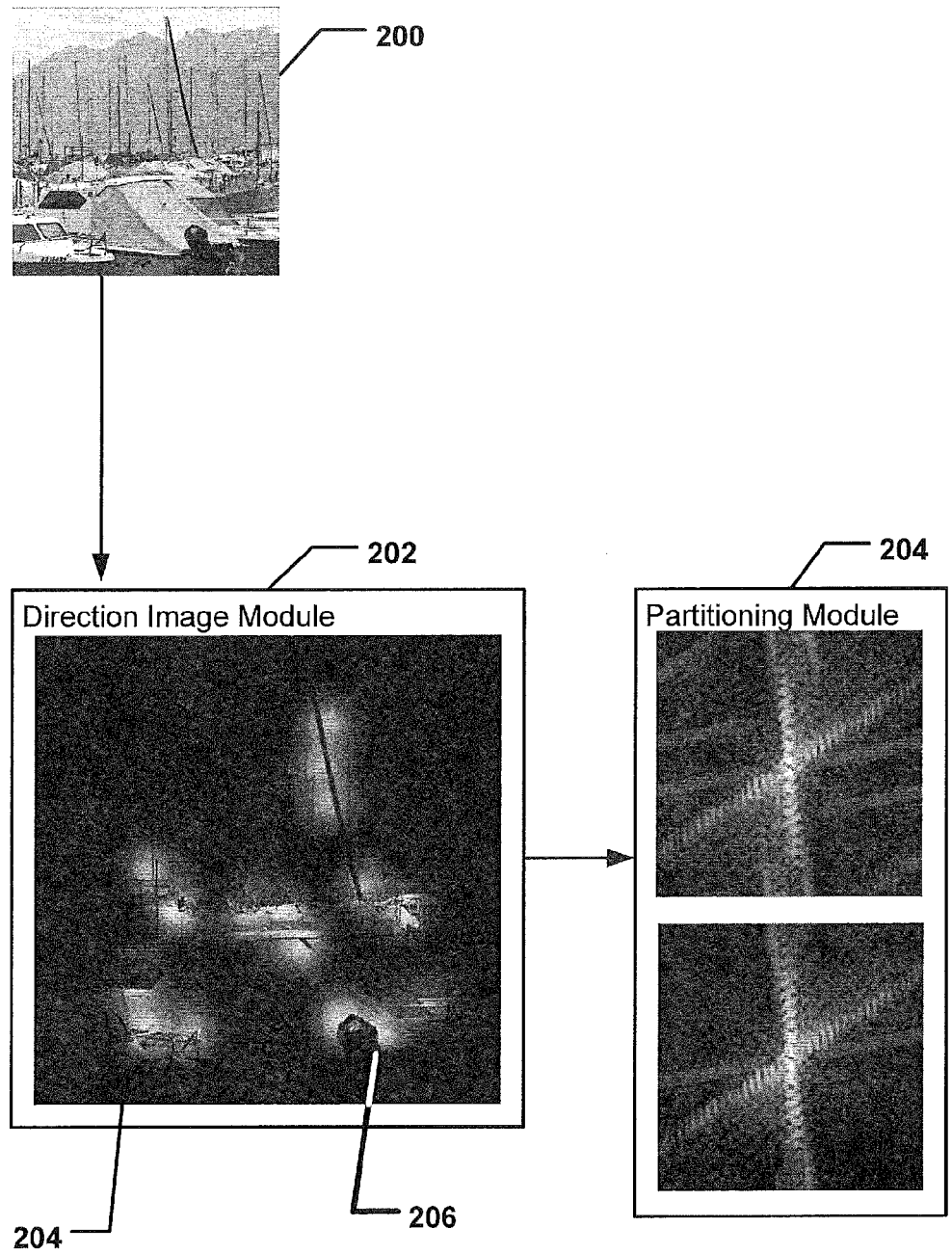
FIG. 2 is a block diagram of another embodiment of a system to estimate the severity of an aliasing error on an image.

Referring to FIG. 2, a system to estimate the severity of an aliasing error is illustrated. FIG. 2 shows an image 200. The image 200 is processed by a directional image module 202 to identify image patches that are likely to contain strong directional energy with few distractions. In one embodiment, the directional image module 202 decomposes the image 200 into overlapping patches 206 to produce a patch image 204. For each overlapping patch 206, a finely-quantized direction for the energy is estimated. The patch image 204 is sent to a partitioning module 204 and the total energy of each patch is partitioned into estimated signal energy and aliasing energy. In a particular embodiment, an estimate of the severity of an aliasing error is obtained in accordance with equation (4) below.

Figure 3:
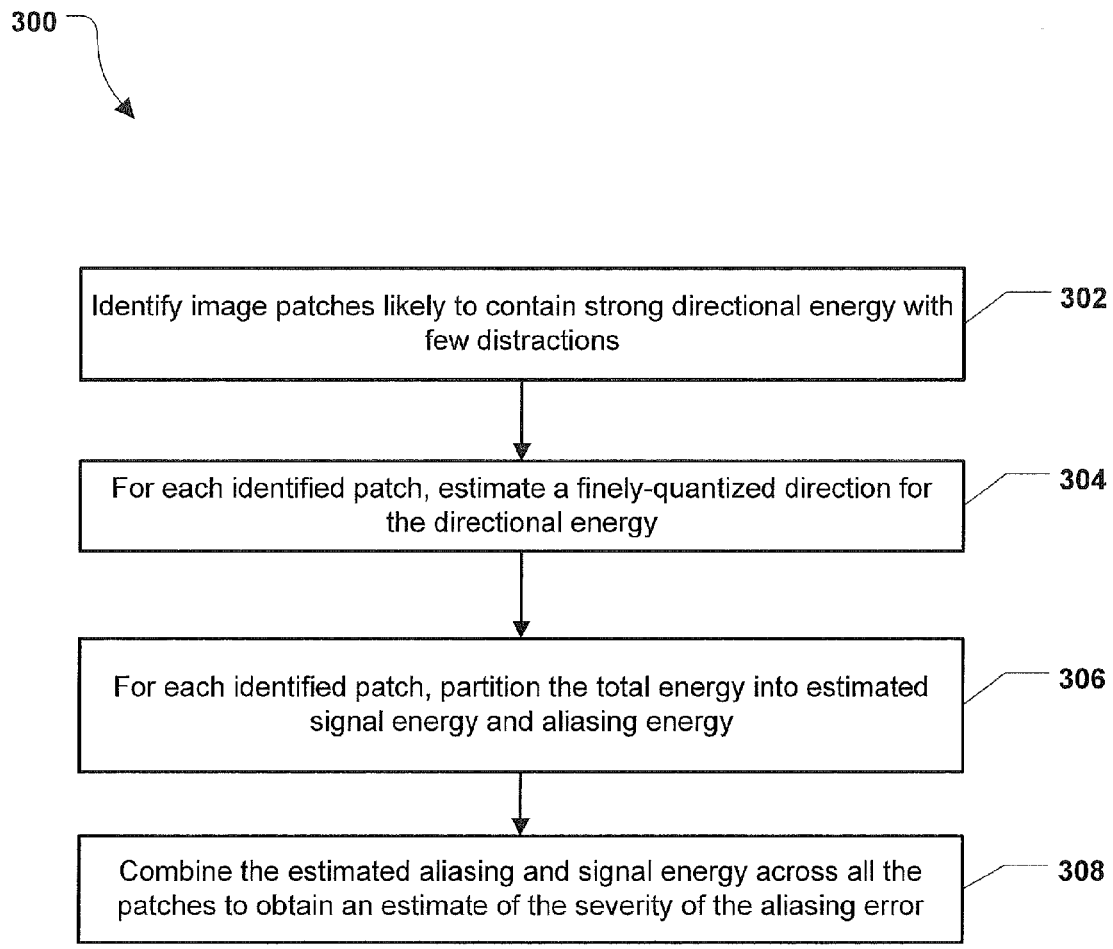
FIG. 3 is a flow diagram of a particular embodiment of a method to identify image patches.
Figure 4:
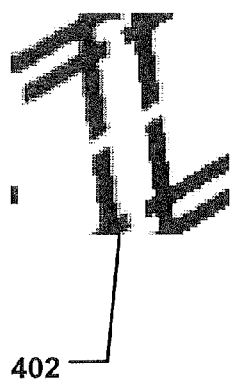
FIG. 4 is a general diagram to illustrate an embodiment of identifying image patches in accordance with the method of FIG. 3.
Figure 4:
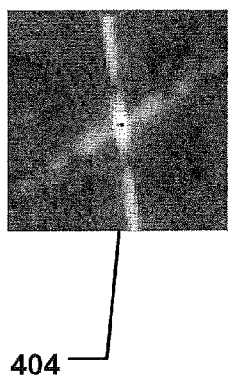
Figure 4:
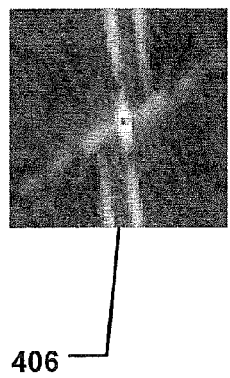
Figure 4:
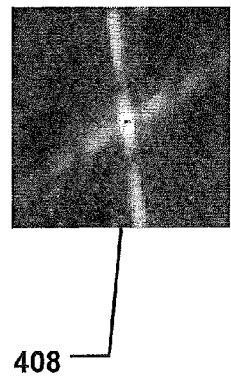

FIG. 3 is a flow diagram of a first particular embodiment of a method to estimate the severity of an aliasing error and is designated 300. For illustrative purposes, the method references FIG. 4. FIG. 4 depicts an aliasing mask 402 measured for frequencies in $A^p$ but not in $M^p$, where $A^p$ is the set of all aliasing masks and $M^p$ is the set of all masks. FIG. 4 also depicts an image before patch identification 406, after patch identification 404, and an ideal representation of the image 408. First, image patches likely to contain strong directional energy with few distractions are identified, at 302. For example, the impact of aliasing may be analyzed. Moving to 304, for each patch, a finely-quantized direction for the energy is estimated. In a particular embodiment, the log of the squared-magnitude of the DFT with the DC value removed is used to estimate a finely quantized direction for the energy. Continuing to 306, for each patch, the total energy is partitioned into estimated signal energy and aliasing energy, such as based on the aliasing locations predicted by the detected directional components and assuming only one term of aliasing from equation (1). For example, in FIG. 4, the image 406 shows the total energy partitioned into estimated signal energy and aliasing energy. Advancing to 308, the estimated aliasing and signal energies are combined across all of the patches to obtain an estimate of the severity of the aliasing error. For example, in FIG. 4, directional energy and aliasing mask 402 illustrates the location of a folded directional energy for the first term in the summation of equation one and creates an estimate of the severity of the aliasing error. In one embodiment, a signal-to-aliasing ratio (SAR) across all measured patches may be represented as $$SAR = 10\log_{10}\left(\frac{\sum_{\{p \in P\}}\sum_{i,j} Z^p_{sig}(i,j)}{\sum_{\{p \in P\}}\sum_{i,j}(Z^p(i,j) - Z^p_{sig}(i,j))}\right) \quad (4)$$

where the numerator is the estimated energy in the signal without aliasing, and the denominator is the estimated energy in the aliasing components.

Figure 5:
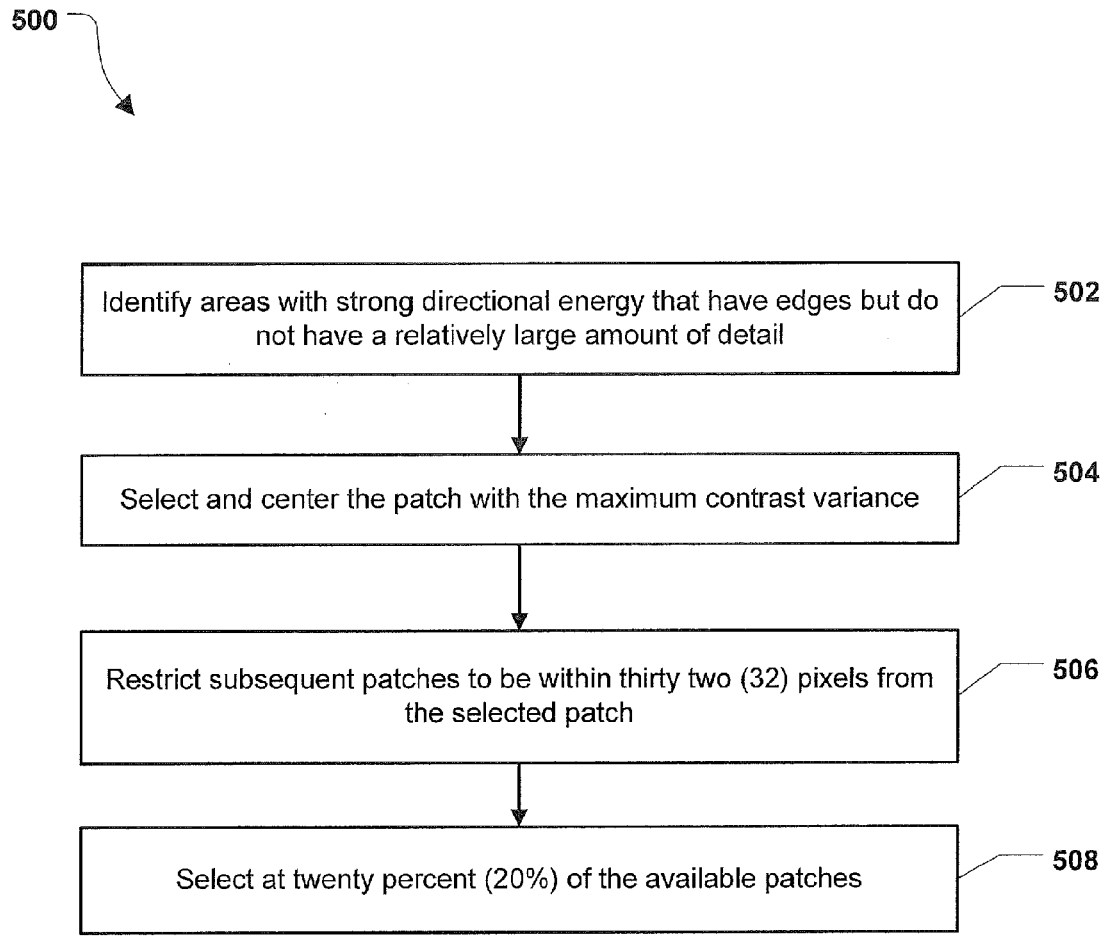
FIG. 5 is a flow diagram of a particular embodiment of a method to identify image patches.

FIG. 5 is a flow diagram of a particular embodiment of a method to identify image patches and is designated 500. First, areas with strong directional energy that have edges but do not have a relatively large amount of detail (i.e. are not too busy), are identified, at 502. In one embodiment, the local contrast is defined as $C_y(m,n) = (\sigma_y(m,n))/(\mu_y(m,n))$ where $\mu_y(m,n)$ is the local mean of the image and $\sigma_y(m,n)$ is the local standard deviation of the image y over a 7×7 pixel region centered on pixel (m,n). Areas with strong local contrast may contain strong edges, however they may also be very busy regions or regions with a relatively large amount of detail. The local variance of the contrast image at pixel (m,n) is computed as $\sigma_C(m,n)$. Regions with small $\sigma^2_C(m,n)$, or local variance, but large $C_y(m,n)$, or local contrast, are likely to have many distractions and therefore not have strong isolated edges. Regions with a large contrast variance, however, are more likely to have strong isolated edges and therefore make it easier to identify directional energy. Moving to 504, the patch with the maximum contrast variance is selected, centered, and used as a first patch. Continuing to 506, subsequent patches are restricted to be within thirty-two pixels from the selected patch and a search is done for the next patch with the maximum contrast variance that is within thirty-two pixels from the selected patch. Advancing to 508, the method continues until at least twenty percent (20%) of the available patches have been selected. For example, in FIG. 1, at least twenty percent (20%) of the available overlapping patches 106 are selected to produce the patch harbor image 104. In a particular embodiment, each patch is multiplied by a Blackman-Harris window centered on a patch center to eliminate or reduce image-boundary effects.

Figure 6:
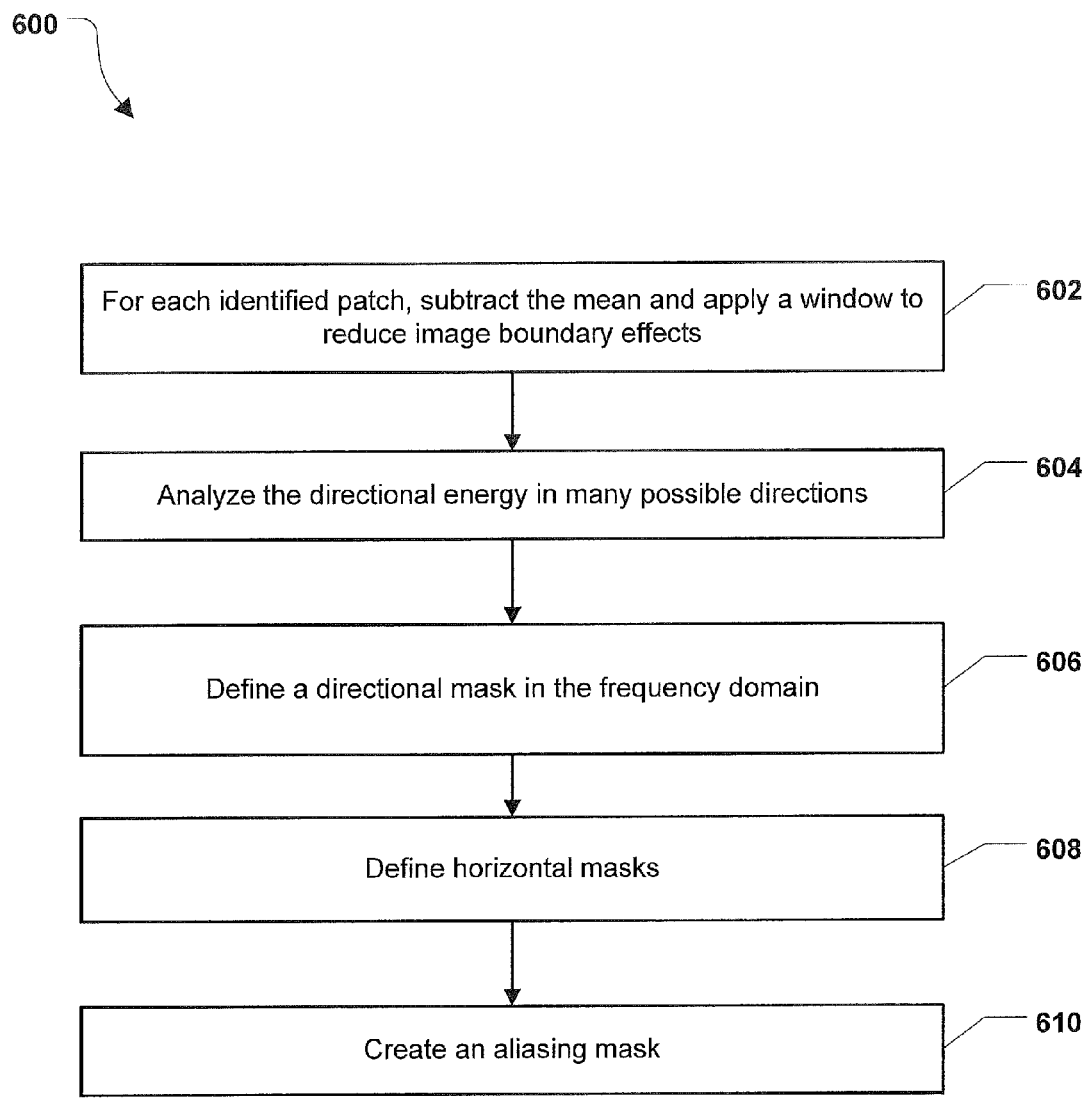
FIG. 6 is a flow diagram of a particular embodiment of a method to perform a direction-finding algorithm.

FIG. 6 is a flow diagram of a particular embodiment of a method to identify a directional image for each identified patch and is designated 600. For each patch, the mean is subtracted and a Blackman-Harris window may be applied to the patch to reduce image boundary effects, at 602. For example, $Z^p(i,j)$ is the squared magnitude of the two-dimensional ("2-D") DTFT of a p×p windowed patch, where $-p/2 \leq (i,j) < p/2$. Moving to 604, directional energy in many possible directions is analyzed using directional masks created by Bresenham lines. For example, let $M_s(i,j)$ be a vertical directional mask for the direction indexed by s, defined in the frequency domain. In one embodiment, there is one mask for each direction s, where $-p/2 < s < p/2$, where the Bresenham line extends from the frequency bin $(-s, -p/2+1)$ to the frequency bin $(s, p/2-1)$. The mask takes values one on the Bresenham line and zero otherwise. In another particular embodiment, all or substantially all the possible directions are analyzed. Advancing to 606, directional masks are defined in the frequency domain. Continuing to 608, horizontal masks are defined, $M_s(i,j)$ for $p/2 < s < 3p/2$, which take value one on the Bresenham line from frequency bin $(-p/2+1)$ to frequency bin $(p/2-1,s)$. In a particular embodiment, $M_s(i,j)$ is a binary line of width of five (w=5) created using Bresenham's algorithm. The Bresenham algorithm is an algorithm that determines what points in an n-dimensional raster should be plotted in order to form a close approximation to a straight line between two given points. Advancing to 610, a set of aliasing masks As(i,j) is created. The aliasing mask is an extension of the directional mask Ms(i,j) folded once, similar to the process performed during down sampling. For example, as shown in FIG. 1, the sum of As(i,j) and Ms(i,j) is illustrated as directional energy and aliasing mask 116 for one specific value of s.

Figure 7:
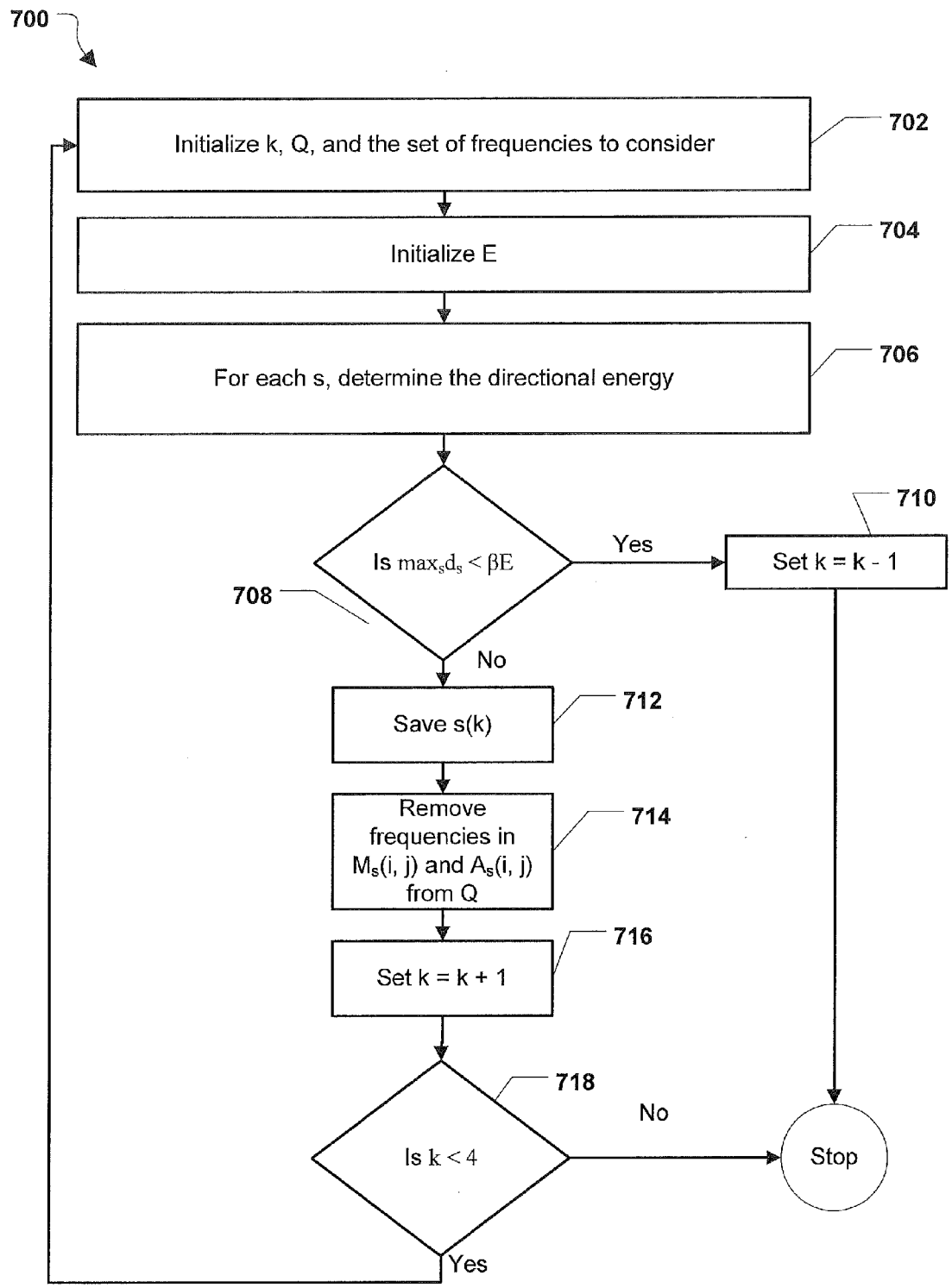
FIG. 7 is a flow diagram of a particular embodiment of a method to perform a direction-finding algorithm.

FIG. 7 is a flow diagram of a particular embodiment of a method to perform a direction-finding algorithm and is designated 700. The goal of the direction finding algorithm is to find the main directional energy that might cause aliasing, without becoming distracted by low-frequency energy or by any strong aliasing components in the high and middle frequencies. Because there may be several strong directional lines in the image, one particular embodiment searches for multiple directions. The direction finding algorithm may iteratively identify directions in the spatial frequency domain that contain strong directional energy. As each direction is identified, the energy in the corresponding frequency bins is set to zero. This may enable additional directions of strong directional energy, if present, to be identified. Let Q be the set of frequencies to be considered, where Q is a two-dimensional set of frequencies in the spatial frequency domain. As the direction finding algorithm proceeds, frequencies with identified strong directional energies may be removed from the set Q. When the direction finding algorithm terminates, Q contains the frequency bins that do not contain identified strong directional energy. The identified directions can be indicated by s(k), for $1 \leq k \leq k_{max}$. Let E be the total energy in the frequency bins in Q. Let β be a fraction between 0 and 1. First, k is initialized to equal 1 and Q, the set of frequencies to consider, is initialized, at 702. For example, the set of frequencies to consider may be initialized to $\{(i,j) | 3 \leq |i|, |j| \leq (p/2)\}$.

Moving to 704, the total energy in the frequency bins in Q, E, is initialized. For example, E may be initialized to $\Sigma_{(i,j) \in Q} Z^p(i,j)$. Continuing to step 706, for each s, the energy in that direction is determined. For example, the directional energy may be determined using $$d_s = \sum_{(i,j) \in Q} M_s(i,j) Z^p(i,j). \quad (3)$$

Advancing to 708, if the maximum $d_s$ for all possible values of s where $-p/2 \leq s < 3p/2$ is less than some fraction $\beta$ of the energy E, $\max_s d_s < \beta E$, then the algorithm may determine that all strong directions have been identified, $k_{max}$ is set to k−1, and the process is stopped at 710. Moving to 712, if $\max_s d_s \geq \beta E$, the algorithm may determine that the direction s that maximizes $d_s$ contains strong directional energy, so s(k) may be saved and set to be the value of s that maximizes ds. Continuing to 714, frequencies in $M_s(i,j)$ and $A_s(i,j)$ are removed from Q. Advancing to 716, k is set equal to k+1. Moving to 718, if k<4 the process is complete for the current patch. In a particular embodiment, $\beta$ is set to 0.05. For each index of directional energy $1 \leq k \leq k_{max}$ the directional mask $M_{s(k)}(i,j)$ indicates the frequency bins containing identified strong directional energy, and the aliasing masks $A_{s(k)}(i,j)$ indicates the frequency bins containing potential aliasing energy due to downsampling. The union of directional masks $M_{s(k)}(i,j)$ for $1 \leq k \leq k_{max}$ is denoted $M^p$, and the union of aliasing masks $A_{s(k)}(i,j)$ for $1 \leq k \leq k_{max}$ is denoted $A^p$.

Figure 8:
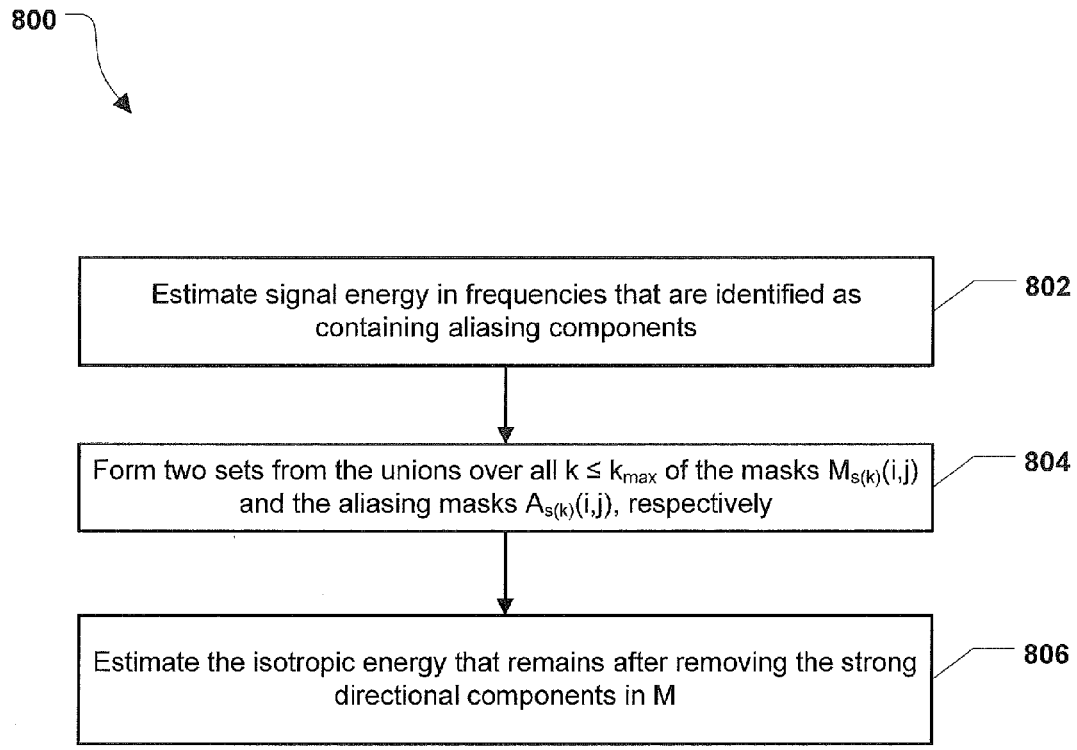
FIG. 8 is a flow diagram of a particular embodiment of a method to estimate signal energy without aliasing components.

FIG. 8 is a flow diagram of a particular embodiment of a method to estimate what the signal energy would be without aliasing components and is designated 800. First, signal energy in frequencies that are identified as containing aliasing components is estimate, at 802. In a particular embodiment, the frequencies that are identified are based on the directions that s(k) is estimated. Moving to 804, two sets, $M^p$ and $A^p$, are formed from the unions over all $1 \leq k \leq k_{max}$ of the masks $M_{s(k)}(i,j)$ and the aliasing masks $A_{s(k)}(i,j)$, respectively. Because, frequencies in $M^p$ are often known to have strong signal energy that will mask aliasing energy, in a particular embodiment, aliasing energy is measured only for those frequencies in $A^p$ that are not in $M^p$. Continuing to 806, the isotropic energy that remains after removing the strong directional components in M is estimated. This forms a lower bound on the estimated signal energy for the frequencies in $A^p$ but not in $M^p$. Advancing to 808, the signal energy is estimated on either side of the mask for those frequencies in $A^p$ but not in $M^p$. For example, the signal energy $Z^p_{sig}(i,j)$ may be set equal to $\min(Z(i,j), \max(Z^p_{iso}(i,j), Z^{-p}(i,j)))$, where $Z^{-p}(i,j)$ is the average energy in $Z^9(i,j)$ and is estimated on either side of the mask $A_{s(k)}(i,j)$ for those frequencies in $A^p$ but not in $M^p$.

Figure 9:
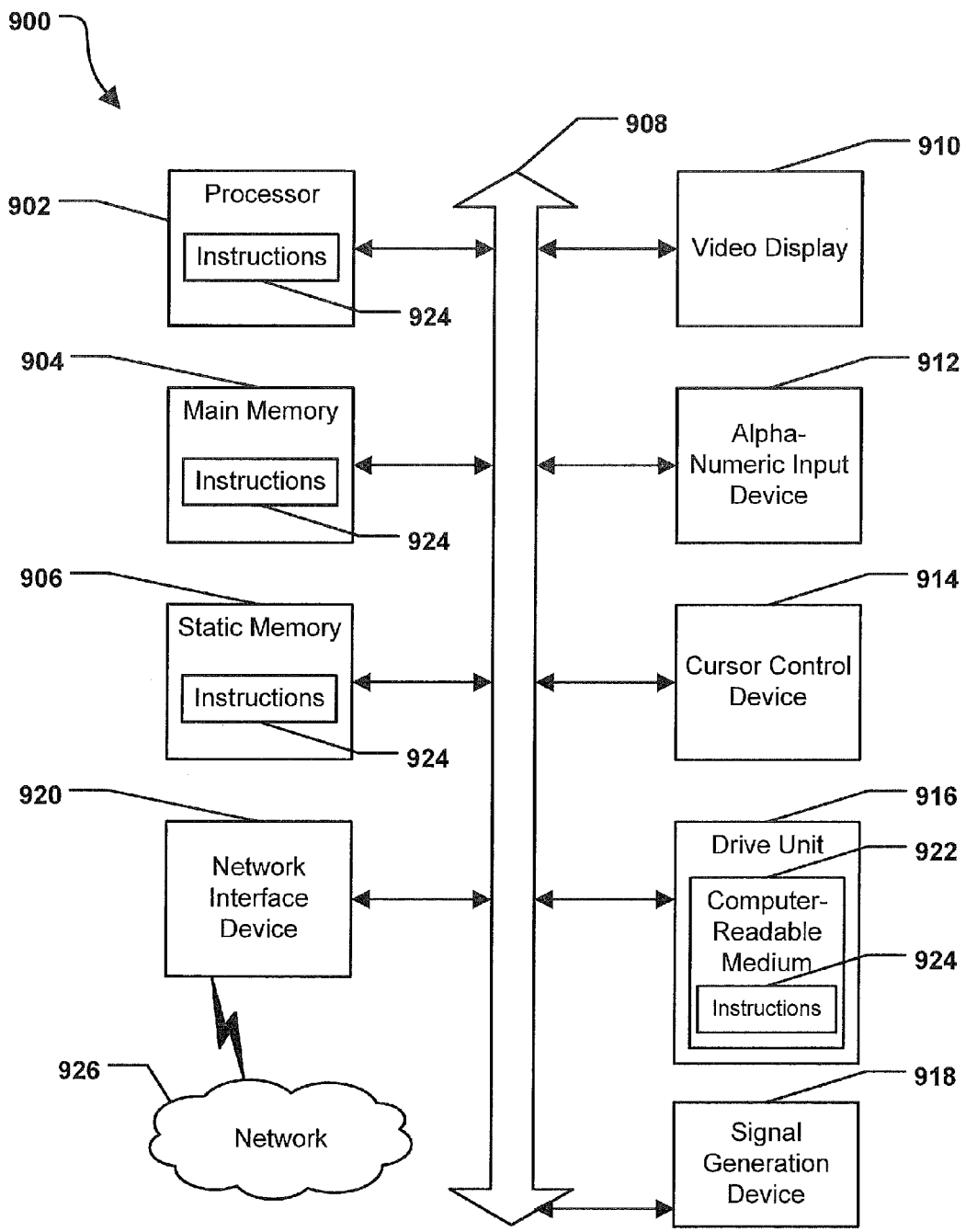
FIG. 9 is a block diagram of an illustrative embodiment of a general computer system.

Referring to FIG. 9, an illustrative embodiment of a general computer system is shown and is designated 900. The computer system 900 can include a set of instructions that can be executed to cause the computer system 900 to perform any one or more of the methods, algorithms, or computer based functions disclosed herein, such as one or more of the methods of FIGS. 3-7. The computer system 900, or any portion thereof, may operate as a standalone device or may be connected, e.g., using a network, to other computer systems or peripheral devices.

In a networked deployment, the computer system 900 may operate in the capacity of a server. The computer system 900 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics-processing unit (GPU), or both. Moreover, the computer system 900 can include a main memory 904 and a static memory 906 that can communicate with each other via a bus 908. As shown, the computer system 900 may further include a video display unit 910, such as a liquid crystal display (LCD), an organic light emitting diode (OLED), a flat panel display, a solid-state display, or a cathode ray tube (CRT). Additionally, the computer system 900 may include an input device 912, such as a keyboard, and a cursor control device 914, such as a mouse. The computer system 900 can also include a disk drive unit 916, a signal generation device 918, such as a speaker or remote control, and a network interface device 920.

In a particular embodiment, as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium"

includes a single medium or multiple media, such as a centralized or distributed database, and/or associated caches and servers that store one or more sets of instructions. The term "computer-readable medium" shall also include any tangible storage medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal including computer instructions.

Although the present specification describes components and functions that may be implemented in particular embodiments with reference to particular standards and protocols, this disclosure is not limited to such standards and protocols. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be interpreted based on the broadest permissible interpretation of the following claims and their equivalents, and shall not be restricted or limited by the foregoing detailed description.

What is claimed is:

1. A method comprising:
   identifying, at a computing device, an area in an image, wherein the area is associated with strong directional energy;
   determining, at the computing device, a first estimate of signal energy for the area and a second estimate of aliasing energy for the area; and
   estimating, at the computing device, a severity of an aliasing error of the image based on the first estimate.

2. The method of claim 1, further comprising determining a quantized direction based on the strong directional energy associated with the area.

3. The method of claim 2, further comprising determining an aliasing location based on the quantized direction.

4. The method of claim 3, wherein the first estimate and the second estimate are determined based on the aliasing location.

5. The method of claim 1, wherein the area is identified based at least in part on the area having a particular contrast variance.

6. The method of claim 1, further comprising measuring jagginess in the image caused by aliasing.

7. The method of claim 1, wherein estimating the severity of the aliasing error includes determining a signal-to-aliasing ratio.

8. The method of claim 1, wherein the image is converted from a second image, the second image being different in size than the image.

9. A method comprising:
   identifying, at a computing device, a plurality of areas in an image, the plurality of areas associated with strong directional energy, wherein the strong directional energy is determined based on a particular amount of contrast variance;

selecting, at the computing device, a particular area of the plurality of areas, based at least in part on a particular contrast variance; and determining, at the computing device, a patch image based on selecting a particular set of the plurality of areas in the image that are associated with the strong directional energy, wherein the particular set excludes the particular area, and wherein the particular set includes at least one of the plurality of areas.

10. The method of claim 9, further comprising removing image boundary effects of the image from the patch image by application of a Blackman-Harris window function.

11. The method of claim 9, further comprising removing image boundary effects of the image from the patch image by subtracting a mean brightness value of the image from data associated with each of the plurality of areas.

12. The method of claim 9, wherein each area of the particular set of the plurality of areas is located no more than thirty-two pixels from the particular area.

13. The method of claim 9, wherein the particular set of the plurality of areas includes twenty percent of the plurality of areas.

14. The method of claim 9, wherein the particular set of the plurality of areas includes twenty percent of the plurality of areas that are overlapping.

15. The method of claim 9, wherein the particular area is an area that has a largest contrast variance of the plurality of areas.

16. A method comprising:

identifying, at a computing device, a plurality of areas in an image, the plurality of areas associated with strong directional energy, wherein the strong directional energy is determined based on a particular amount of contrast variance;

reducing, at the computing device, boundary effects of the image based at least in part on application of a Blackman-Harris window function to each of the plurality of areas;

applying, at the computing device, one or more directional masks based on Bresenham lines to one or more directions of the strong directional energy to identify one or more particular areas of the plurality of areas; and applying, at the computing device, an aliasing mask to the one or more particular areas.

17. The method of claim 16, wherein the one or more directional masks indicate one or more frequency groups of the strong directional energy.

18. The method of claim 16, wherein the Blackman-Harris window function is applied to a center portion of each of the plurality of areas.

19. The method of claim 16, further comprising subtracting a mean brightness value of the image from data associated with each of the plurality of areas.

20. The method of claim 16, further comprises folding the one or more directional masks to form the aliasing mask.

* * * * *